(12) United States Patent
Prasad et al.

(10) Patent No.: US 6,275,491 B1
(45) Date of Patent: Aug. 14, 2001

(54) PROGRAMMABLE ARCHITECTURE FAST PACKET SWITCH

(75) Inventors: Sharat C. Prasad; Ah-Lyan Yee; Pak Kuen Fung, all of Plano; Randall J. Landry, Allen, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/086,779

(22) Filed: May 28, 1998

Related U.S. Application Data

(60) Provisional application No. 60/048,375, filed on Jun. 3, 1997.

(51) Int. Cl.$^7$ ...................................................... H04J 3/24
(52) U.S. Cl. ........................................... 370/389; 370/351
(58) Field of Search ................................. 370/389, 400, 370/401, 402, 403, 399, 395, 428, 229, 412–418, 430, 230, 231, 234, 249, 236, 252, 465, 468, 384, 351, 352, 356, 360, 363, 367, 368, 369, 375, 376, 378, 411, 447, 444, 442, 461, 462, 392, 394; 340/825.01, 825.03, 825.5, 825.51

(56) References Cited

U.S. PATENT DOCUMENTS

| | | | | |
|---|---|---|---|---|
| 5,978,359 | * | 11/1999 | Caldara et al. | ........................ 370/414 |
| 6,021,132 | * | 2/2000 | Muller et al. | ......................... 370/412 |

OTHER PUBLICATIONS

Henry Gilbert, et al., "Developing a Cohesive Traffic Management Strategy for ATM Networks", *IEEE Communications Magazine*, 10/91, pp. 36–45.

Stiliadia, et al., "FAST: An FPGA–Based Simulation Testbed for ATM Networks", *IEEE International Conference on Communications*, Conference Record Volume 1 of 3, Jun 23–27, 1996, pp. 374–378.

Suzuki, et al., "Output–buffer Switch Architecture for Asynchronous Transfer Mode", Boston International Conference on Communications, Jun. 11–14,1989, pp. 99–103.

Xillinx, "XC4000 Series Field Programmable Gate Arrays", Product Specification, Version 1.04, Sep. 18, 1996, pp. 4–5 thru 4–53 and 4–175 thru 4–179.

\* cited by examiner

*Primary Examiner*—Dang Ton
(74) *Attorney, Agent, or Firm*—J. Dennis Moore; W. James Brady, III; Frederick J. Telecky, Jr.

(57) ABSTRACT

A programmable fast packet switch testbed (10) for use in the evaluation of prototype architectures and traffic management algorithms is disclosed. The programmable switch (10) is arranged as an add-on peripheral to a conventional computer system including a host central processing unit (CPU) (2). The switch (10) includes a plurality of port processors (14) in communication with port interfaces (12); each of the port interfaces (12) is a conventional interface for high data rate communication, while the port processors (14) are programmable logic devices. The switch fabric is realized in a multiple slice fashion, by multiple programmable logic devices (18). A central arbiter (30), also realized in programmable logic, controls routing of cells within the switch (10). Programming of the port processors (14), fabric slices (18), and arbiter (30) is effected by downloading, into these devices, bit-streams supplied by the host CPU (2) that define the switch architecture, including selection of input or output queuing and the fabric type, along with the implementation of traffic management algorithms in the port processors (14), fabric slices (18), and arbiter (30). Each of the port processors (14), fabric slices (18), and arbiter (30) also contain memory locations for storing results of operation, which are read by the management port (24) over a management bus (COMET), and may then be forwarded to the host CPU (2), without interfering with switch traffic. The programmable switch (10) is therefore capable of full speed operation as a fast packet switch, thus providing accurate evaluation results.

21 Claims, 6 Drawing Sheets

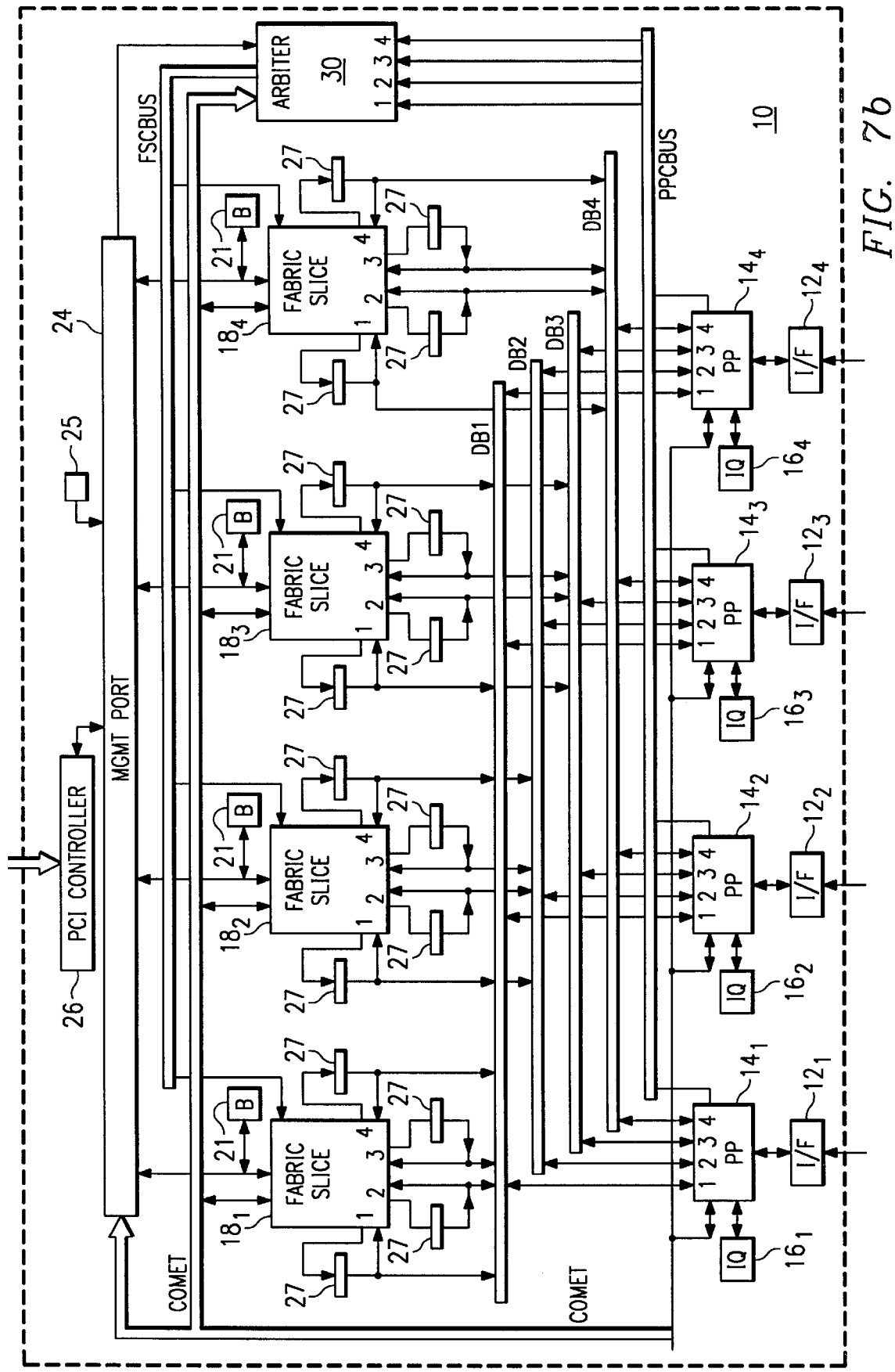

PROGRAMMABLE ARCHITECTURE FAST PACKET SWITCH

CROSS-REFERENCE TO RELATED APPLICATIONS

This application claims priority under 35 U.S.C. §119(e)(1) of provisional application Ser. No. 60/048,375 filed Jun. 3, 1997, the entirety of which is incorporated herein by reference.

STATEMENT REGARDING FEDERALLY SPONSORED RESEARCH OR DEVELOPMENT

Not applicable.

BACKGROUND OF THE INVENTION

This invention is in the field of fast packet switched data communication, and is more specifically directed to the prototyping of switch architectures and traffic management algorithms.

In the field of digital communications, whether applied to voice, video, or data communication, various communication techniques have been developed for routing messages among nodes, or processors, that are connected over a network. One technique is referred to as datagram forwarding, where the sending unit transmits the entirety of a variable length packet, along with header information indicating the origin and destination addresses in the network, to a collection center for temporary storage and forwarding to the message destination. Another technique utilizes synchronous time-division multiplexers or circuit switches, which are computers or processors that receive, from multiple sources, fixed length frames that each consist of a certain number of fixed length packets. According to this technique, the synchronous time-division multiplexer or circuit switch then composes outgoing frames from the packets of the incoming frames and, without temporarily storing the packets, transmits these outgoing frames over outgoing lines, for example in time-division multiplexed fashion.

Within the confines of a workgroup or local area network (LAN), datagram forwarding is performed using repeaters and, more recently, packet switches. According to the packet switching approach, certain network nodes operate as concentrators to receive portions of messages, referred to as packets, from the sending units. These packets may be stored at the concentrator, and are then routed to a destination concentrator to which the receiving unit indicated by the packet address is coupled. The size of the packet refers to the maximum upper limit of information which can be communicated between concentrators (i.e., between the store and forward nodes), and is typically a portion of a message or file. Each packet includes header information relating to the source network address and destination network address, which permits proper routing of the message packet. Packet switching ensures that routing paths are not unduly dominated by long individual messages, and thus reduces transmission delay in the store-and-forward nodes. Fast packet switching refers to packet switching techniques that operate at high data rates, up to and exceeding hundreds of megabits per second.

A well-known example of a fast packet switching protocol, which combines the efficiency of packet switching with the predictability of circuit switching, is asynchronous transfer mode (generally referred to as "ATM"), in which packet lengths and organization are fixed, regardless of message length or data type (i.e., voice, data, or video). The fixed packets according to the ATM protocol are referred to as "cells", and each ATM cell is composed of a fifty-three bytes, five of which are dedicated to the header and the remaining forty-eight of which serve as the payload. According to this protocol, larger packets are made up of a number of fixed-length ATM cells.

The architecture of conventional fast packet switches may be considered, at a high level, as a number of inter-communicating processing blocks. FIG. 1 illustrates the high-level common architecture of a conventional fast packet switch. In this switch, ports $P_0$ through $P_n$ are in communication with various nodes, which may be computers or other switches. Each of ports $P_0$ through $P_n$ receive data over an incoming link, and transmits data over an outgoing link. Each of ports $P_0$ through $P_n$ are coupled to switch fabric F, which effects the routing of a message from the one of ports $P_0$ through $P_n$ associated with the upstream node on the path to the source of packet, to the one of ports $P_0$ through $P_n$ associated with the downstream node on the path to the destination of the packet. In this fast packet switching architecture, individual packets are routed from one of ports $P_0$ through $P_n$ to switch fabric F to another one of $P_0$ through $P_n$; each of ports $P_0$ through $P_n$ have sufficient capability to divide the packet into slices (when on the input end) and to reconstruct slices into a packet (when on the output end). Arbiter A is provided to control the queuing of packets into and out of switch fabric F, and to control the routing operation of switch fabric F accordingly.

While the high-level architecture of fast packet switches may be substantially common, different architectural approaches are used in the implementation of the fast packet switch. These approaches determine the location (input, output, or both) and depth of cell queues or buffers, and also the type of routing used within switch fabric. For example, one architecture may operate by ports $P_0$ through $P_n$ forwarding each received cell immediately to switch fabric F, which transfers cells at its input interfaces to its output interfaces in a time-division multiplexed fashion; on the output side, each cell that is output from switch fabric F is appended to a FIFO queue at its addressed one of ports $P_0$ through $P_n$. Another architecture may utilize input queues at ports $P_0$ through $P_n$, with arbiter A controlling the order in which cells are applied from the input queues to switch fabric F, which operates in a crossbar mode. Another architecture may utilize both input and output queues at ports $P_0$ through $P_n$, with switch fabric F and arbiter A operating as a multistage interconnection network. These and other various architectures are known in the field of fast packet switching.

Also as is well known in the art, actual communication traffic is neither uniform nor independent; instead, real traffic is relatively bursty, particularly in the communication of data and compressed video. As such, traffic management algorithms are often utilized in fast packet switching to manage the operation of the switch and to optimize switch performance. Examples of well-known traffic management algorithms include traffic shaping, flow control, and scheduling. A survey of conventional traffic management algorithms is described in Gilbert, et al., "Developing a cohesive traffic management strategy for ATM Networks", IEEE Communications Magazine (October 1991), pp. 36–45. It has been observed that the performance of a packet switch is often determined as much by the effectiveness of its traffic management algorithms as by the actual speed of the packet forwarding datapath. Because of the significant effect of traffic management algorithms on switch performance, significant development has been and is being undertaken in improvement of traffic management techniques in fast packet switches.

It has been observed, in connection with the present invention, that the testing and evaluation of experimental fast packet switch architectures and experimental traffic management algorithms is very difficult. The non-uniformity and dependence of real switch traffic (as noted above) renders modeling of fast packet switch operation to be very difficult and inaccurate, especially in bursty applications such as data and compressed video communication. In the evaluation of traffic management algorithms, this difficulty is exacerbated by the wide array of architectures in which fast packet switching is implemented, particularly when such architectures are implemented by way of application-specific integrated circuits (ASICs) in which case the prototypes are both expensive and time-intensive to fabricate and operate. In addition, conventional fast packet switching simulations are extremely slow, with rates often below 10 cells/second, resulting in extremely long simulation runs and also the inability to detect high-speed errors.

By way of further background, Stiliadis, et al., "FAST: An FPGA-Based Simulation Testbed for ATM Networks", 1996 IEEE *International Conference on Communications: Conference Record*, Vol. 1 (IEEE, 1996), pp. 374–378, describes the construction of hardware simulation of ATM switches using high-density field programmable gate arrays (FPGAs). According to this approach, however, the simulation does not achieve full-speed (or "real-speed") port operation, and as such can only simulate actual fast packet switch operation.

By way of still further background, multiple-slice organization of switch fabric in fast packet switching is known, as described in Suzuki, et al. "Output Buffer Switch Architecture for ATM", *Proceedings of International Conference on Communications* (ICC, 89) (IEEE, 1989), pp. 99–103. As described therein, multiple-slice switch fabric is useful in the reducing the I/O burden on the switch fabrics.

BRIEF SUMMARY OF THE INVENTION

The present invention may be implemented into a programmable fast packet switch that is particularly useful in a prototyping environment. According to the present invention, field programmable logic devices are used to implement multiple port processors, a switch fabric, and an arbiter. Buffers, serving as input queues, are associated with each of the port processors, while output queue buffers are provided at the switch fabric and in association with the ports. The switch architecture is programmed by a management port, and communicated to the field programmable logic devices over a control bus that is orthogonal to the packet forwarding datapath, eliminating overhead from the data communication. The switch fabric may be arranged in multiple-slice form, to obtain high data throughput from the programmable logic devices. Operational results and statistics are maintained at each of the port processors and the switch fabric, and communicated to the management port over the orthogonal control bus.

According to the present invention, the programmable fast packet switch operates as an actual switch, and routes actual traffic among a relatively small number of ports. Accordingly, full speed communication of actual traffic can be performed, enabling accurate measurement of the performance of the switch architecture and traffic management algorithms under evaluation.

It is therefore an object of the present invention to provide a prototype fast packet switch architecture in which full-speed fast packet switching can be performed, and traffic management algorithms operated and evaluated.

It is a further object of the present invention to provide such an architecture that is programmable so as to operate according to various fast packet switch architectures.

It is a further object of the present invention to provide such an architecture in which includes an orthogonal control bus path so that operational statistics can be readily communicated.

It is a further object of the present invention to provide such an architecture in which slower speed programmable devices may be used in the switch fabric.

It is a further object of the present invention to provide such an architecture in which a wide range of data types may be applied to the switch.

Other objects and advantages of the present invention will be apparent to those of ordinary skill in the art having reference to the following specification together with its drawings.

BRIEF DESCRIPTION OF THE SEVERAL VIEWS OF THE DRAWING

FIGS. 7a and 7b are electrical diagrams, in block form, illustrating the enabling of the programmable fast packet switch of FIG. 2 according to first and second prototype architectures.

DETAILED DESCRIPTION OF THE INVENTION

Figure 2:
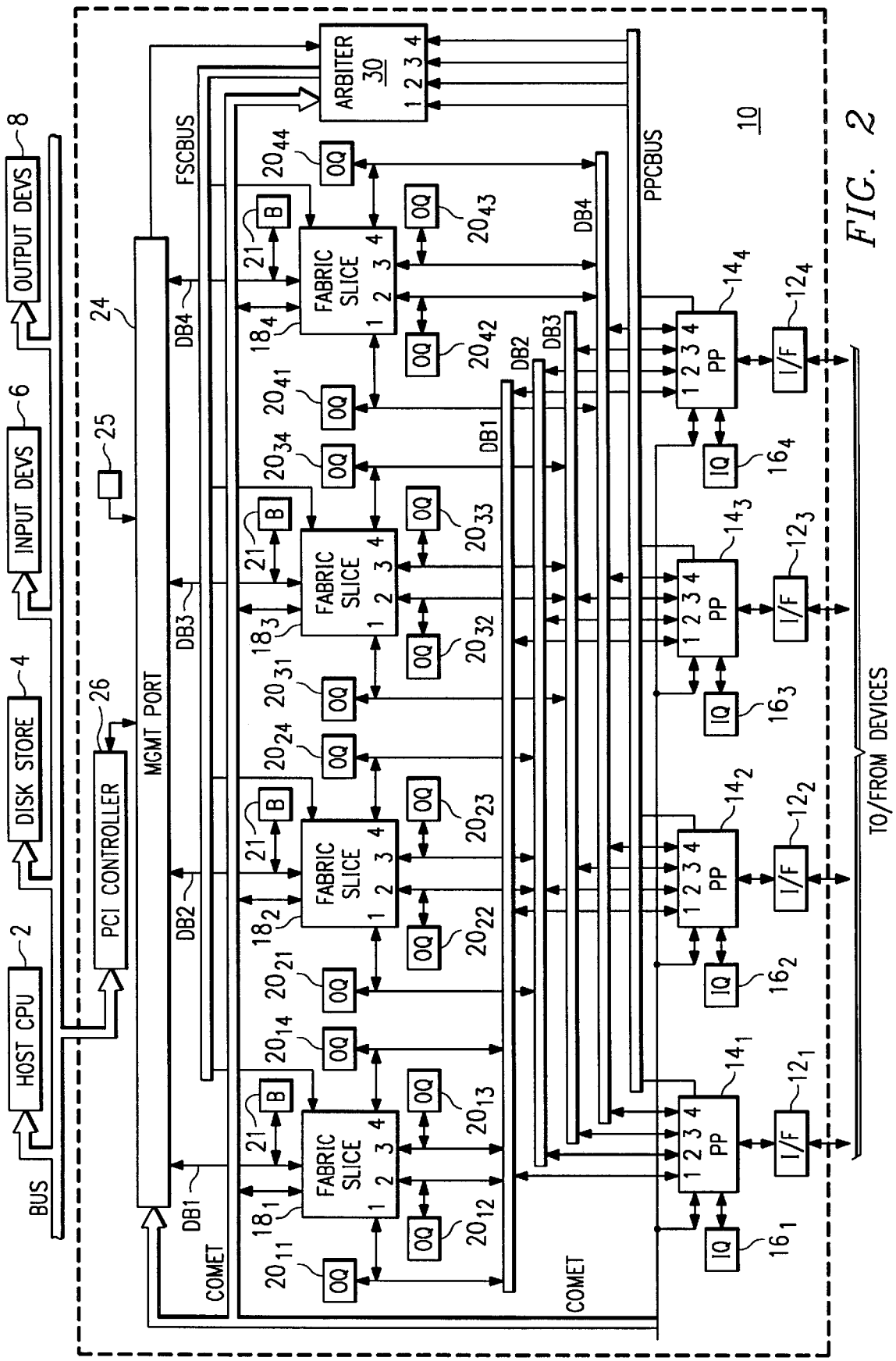
FIG. 2 is an electrical diagram, in block form, of a programmable fast packet switch according to the preferred embodiment of the invention.

Referring now to FIG. 2, the construction of programmable fast packet switch 10, and its implementation into a computer system, according to the preferred embodiment of the invention will now be described in detail. It is to be understood that programmable fast packet switch 10 is described herein by way of example only, as it is contemplated that the present invention may be realized in alternative implementations and according to alternative technologies.

By way of an overall architectural view, programmable fast packet switch 10 according to this embodiment of the invention may be implemented as an add-on card to a conventional personal computer or workstation. In this implementation, programmable fast packet switch 10 interfaces to host central processing unit (CPU) 2 over bus BUS, which may be implemented according to a high-speed protocol; in this example, bus BUS is a PCI bus, to which programmable fast packet switch 10 interfaces by way of PCI controller 26. The host computer system also typically includes devices such as disk store 4, one or more input devices 6, and one or more output devices 8, which are in communication with host CPU by way of bus BUS or, alternatively, by other buses in the system as appropriate. Of course, programmable fast packet switch 10 is useful in many alternative host computer architectures, as the architecture of FIG. 2 is provided by way of example only.

In general, programmable fast packet switch 10 effects communication among a relatively small number of data sources and destinations (which are typically computers or other switches) by way of a number of ports, each of which is implemented by an port interface 12 in association with a port processor 14.

Cell routing is effected in programmable fast packet switch 10 according to this embodiment of the invention by multiple fabric slices 18, each of which is in communication with each of port processors 14 by way of an associated one of data buses DB1 through DB4 (collectively referred to as data buses DB). Each of data buses DB includes multiple groups of lines, each group dedicated to an associated one of port processors 14, with the width of each group determined according to the data path width to be switched in each cycle, as will be described hereinbelow. In this embodiment, for example, data bus DB1 associated with fabric slice $18_1$ includes a group of eight bus lines associated with port processor $14_1$, a group of eight bus lines associated with port processor $14_2$, a group of eight bus lines associated with port processor $14_3$, and a group of eight bus lines associated with port processor $14_4$. Each group of lines in data bus DB1 is served by an individual port at fabric slice $18_1$, as shown in FIG. 2, and is also coupled to an associated one of output queue buffers $20_{11}$ through $20_{14}$; the others of fabric slices $18_2$ through $18_4$ are similarly arranged. In addition, as will be described hereinbelow, a group of eight bus lines (which may be considered as part of data bus DB1) are also associated with management port 24 via an associated output queue buffer 21, for bidirectional communication of operational, maintenance, and control messages between network nodes and the host system. Data buses DB2 through DB4 are similarly arranged in combination with fabric slices $18_2$ through $18_4$, respectively. Accordingly, each of port processors 14 is coupled to each of data buses DB1 through DB4 for communicating data with fabric slices $18_1$ through $18_4$, respectively.

Arbiter 30 provides centralized control of the communication of packet cells between port processors 14 and fabric slices 18, by way of signals communicated over port processor control bus PPCBUS and fabric slice control bus FSCBUS. In this regard, input queue buffers 16 are provided at port processors 14, and output queue buffers 20 are provided at fabric slices 18, both available for use by arbiter 30 in controlling packet cell routing according to the desired architecture and traffic management algorithm.

According to the preferred embodiment of the invention, port processors 14, fabric slices 18, and arbiter 30 are programmable and configurable devices, such as field programmable gate arrays (FPGAs). As such, the organization and operation of port processors 14, fabric slices 18, and arbiter 30, including the enabling of input queues 16 and output queues 20, may be readily programmed and configured according to instructions from host CPU 2 as received by PCI controller 26. For purposes of this description, the term "programming" refers to the defining of the logic arrangement and architecture of port processors 14, fabric slices 18, and arbiter 30 which, in the case of FPGA realization, defines the connection among logic elements within each of the devices. The term "configuration", for purposes of this description, refers to the receipt of detailed parameters by port processors 14, fabric slices 18, and arbiter 30, according to which the programmed architecture of these devices will operate as a packet switch; examples of such configuration parameters include VPI/VCI routing information, the number of cells for which a port processor 14 forwards routing labels to arbiter 30, and the like. Both the programming and the configuration of port processors 14, fabric slices 18, and arbiter 30 is effected by management port 24 in response to instructions from host CPU 2.

Management port 24 is in communication with port processors 14, fabric slices 18, and arbiter 30 by way of control, management, and test bus COMET, over which it programs and configures those devices according to the instructions from host CPU 2. Bus COMET also communicates operational statistics measured by port processors 14, fabric slices 18, and arbiter 30 back to management port 24, for eventual communication to host CPU 2. According to the preferred embodiment of the invention, and considering the pin assignment of conventional FPGA devices, dedicated lines within bus COMET will be used for programming of port processors 14, fabric slices 18, and arbiter 30, separate from the lines over which configuration information and operational statistics are communicated; time-multiplexing of these functions over the same lines of bus COMET is also contemplated, however, depending upon the pin assignment and programmability of the FPGA devices. In any event, according to the preferred embodiment of the invention, bus COMET is a dedicated bus, orthogonal to and separate from the data buses DB1 through DB4 and control buses PPCBUS, FSCBUS, so that the communication of operational statistics will not interfere with or affect the operation of programmable fast packet switch 10. In addition, orthogonal bus COMET avoids the overhead circuitry and control that would otherwise be required to multiplex configuration and measurement information over the datapaths.

Given this overall architectural view of programmable fast packet switch 10, the construction and operation of the component parts of programmable fast packet switch 10 will now be described in detail.

According to the preferred embodiment of the invention and as illustrated in FIG. 2, programmable fast packet switch 10 has four full-duplex ports implemented by physical layer port interfaces $12_1$ through $12_4$. According to the preferred embodiment of the invention, programmable fast packet switch 10 is a backbone ATM switch; accordingly, such port interfaces 12 are implemented by conventional physical layer interface integrated circuits for effecting asynchronous transfer mode (ATM) cell transfer, for example TNETA1500 Physical Layer Interfaces available from Texas Instruments Incorporated. Each of port interfaces 12 are coupled to associated telephony and data communication devices over physical buses, and perform the appropriate framing functions, serial-parallel conversions, and cell processing that are common to all fast packet switching architectures for implementing ATM switching; of course, if fast packet switching according to a different protocol or technology is desired, port interfaces 12 would be selected accordingly. In any event, it is preferred that port interfaces 12 be realized by standard conventional components capable of effecting full data rate communication, to enable the use of programmable fast packet switch 10 as an actual full speed switch for real traffic.

Each of port interfaces $12_1$ through $12_4$ are connected to an associated port processor $14_1$ through $14_4$ by way of a bus such as the well-known UTOPIA bus. Each of port processors 14, according to this preferred embodiment of the invention, are implemented by way of a field programmable gate array (FPGA), preferably of the static random access memory based (SRAM-based) type so that their configuration may be readily programmed and reprogrammed. An example of a conventional SRAM-based FPGA that may be used to implement port processors 14 is the XC4000 series of FPGAs available from Xilinx, Inc. Each port processor 14 and management port 24 is in bidirectional communication with multiple data buses DB1 through DB4; the number of data buses in programmable fast packet switch 10 is selected according to the number of slices used to implement the switch fabric according to achieve the desired data throughput, as will be described hereinbelow. Port processors 14 are also in communication with management port 24 via bus COMET, and with arbiter 30 via control bus PPC-BUS. Each port processor 14 is also associated with an input queue buffer 16, which is available for use according to the desired programmed architecture of programmable fast packet switch 10, and of port processors 14 themselves.

Figure 3:
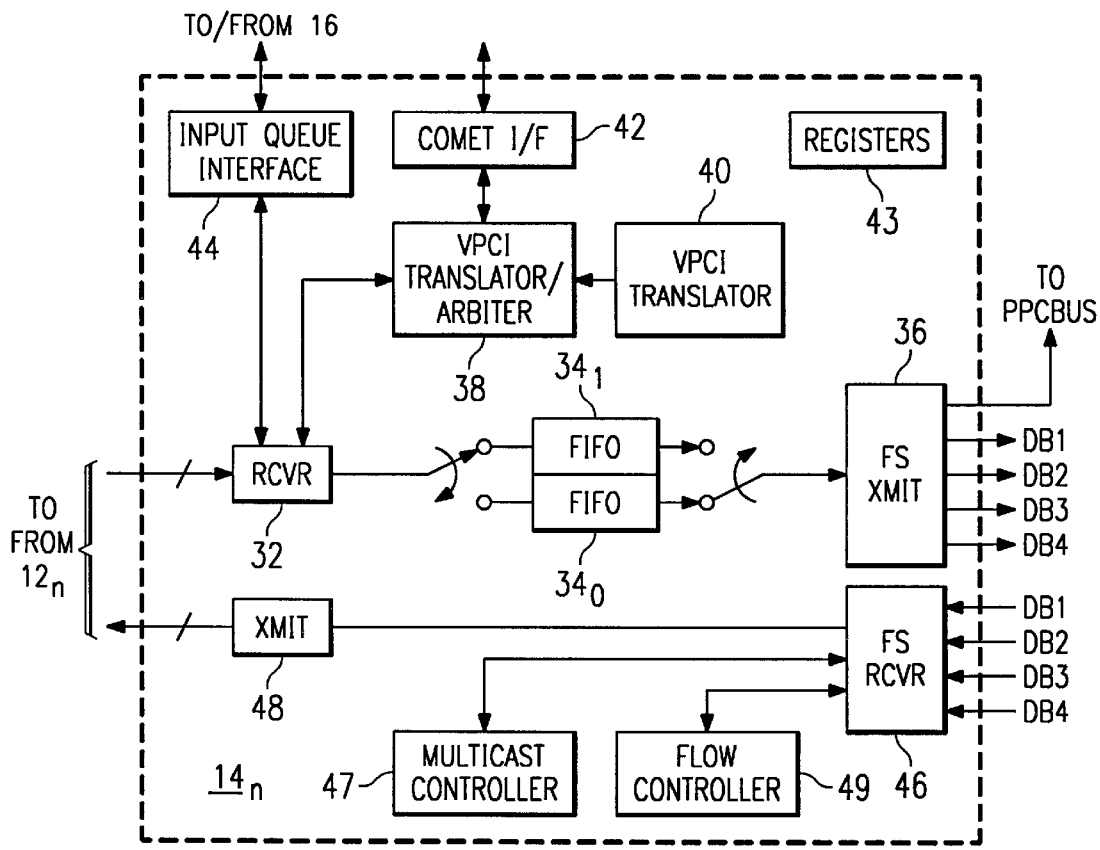
FIG. 3 is an electrical diagram, in block form, of a port processor in the programmable fast packet switch of FIG. 2.

Each of port processors 14 effects bidirectional communication between its associated port interface 12 and the multiple fabric slices 18 in programmable fast packet switch 10, and as such includes both input and output processing functionality. Referring now to FIG. 3, the functional arrangement of a representative port processor $14_n$ according to the preferred embodiment of the invention will now be described in detail; it will be understood, of course, that each of port processors 14 will be arranged similarly as one another.

As noted above, port processors 14 are preferably realized as SRAM-based FPGAs so that their architecture may be programmed and configured under the control of instructions from management port 24. Programming of port processors 14 is, in this example, effected over dedicated lines of bus COMET that are received by the appropriate pin interfaces of port processors 14 according to the pin assignments of the FPGAs used to implement port processors 14; these lines and interfaces are not shown in FIG. 3, for purposes of clarity. An example of the type of programming to be performed upon port processors 14 include both the architectural information for defining connections among logic elements, and also indications regarding whether input queue 16 is to be used in buffering incoming cells Port processor $14_n$ includes COMET interface 42, which is resident on bus COMET as a target for addressed control information and queries. COMET interface 42 thus receives operational configuration information from management port 24 over bus COMET, such configuration information including translation tables by way of which virtual port identifier (VPI) or virtual circuit identifier (VCI) translation and assignment may be made by port processor $14_n$ for incoming cells. Specifically, this operational configuration information includes the assignment of routing labels to cells according to the destination port for the packet. As such, VPCI translator/arbiter 38 and VPCI translator 40 are coupled to COMET interface 42 to receive the appropriate translation tables therefrom. Other configuration operation is also stored by port processor $14_n$, for example in registers 43 which may be certain SRAM locations within the SRAM-based FPGA used to implement port processor $14_n$; registers 43 may also be used to store operational results and statistics, for retrieval by management port 24 over bus COMET in evaluating the operation of programmable fast packet switch 10.

On the input processor side of port processor $14_n$, receiver 32 is coupled to associated port interface $12_n$ to receive cells therefrom, generally in parallel form. Receiver 32 is also coupled to VPCI translator/arbiter 38, which in turn is coupled to VPCI translator 40; VPCI translator/arbiter 38 and VPCI translator 40 determine the destination of incoming cells within programmable fast packet switch 10. Receiver 32 then forwards each incoming cell, once its routing label has been determined by VPCI translator arbiter 38, to a selected one of FIFO buffers $34_0$, $34_1$, for buffering. Alternatively, the incoming cell may be forwarded to input queue 16 via input queue interface 44, depending upon the programming of port processor $14_n$ as indicated by management port 24 over bus COMET; if input queue 16 is enabled, cells are later retrieved therefrom over interface 44 under the control of arbiter 30, for forwarding to FIFO buffers 34. The routing label for each cell that has arrived at port processor 14 is forwarded by fabric slice transmitter 36 to arbiter 30 over bus PPCBUS. Fabric slice transmitter 36 is selectably coupled to one of FIFO buffers 34, generally the one of buffers 34 having the older cell, for transmitting each cell to the indicated fabric slice 18 over the appropriate ones of data buses DB1 through DB4 as determined by arbiter 30.

On the output side, fabric slice receiver 46 is coupled to each of data buses DB1 through DB4 to read routed cells from one of fabric slices 18 after routing. Fabric slice receiver 46 performs read operations from fabric slices 18, or from output queues 20, if used as will be described hereinbelow, to retrieve cells therefrom at such time is appropriate for transmission of the cell. Multicast controller 47 assigns the outgoing VPI/VCI to the copy of a multicast cell being sent out of port processor $14_n$; other copies of the multicast cell are assigned their outgoing VPI/VCI by the multicast controller 47 in their respective outgoing ports. Flow controller 49 may be configured according to a traffic management algorithm to carry out processing, such as rate-based flow control in the Available Bit Rate ATM service. As will be described in further detail below, the order in which cells are ready at fabric slices 18 is under the control of arbiter 30. Upon the reading of a cell, fabric slice receiver 46 forwards the cell to transmitter 48 which transmits the cell to output queue FIFOs at the associated port interface $12_n$ for communication to the intended destination of the packet.

Figure 1:
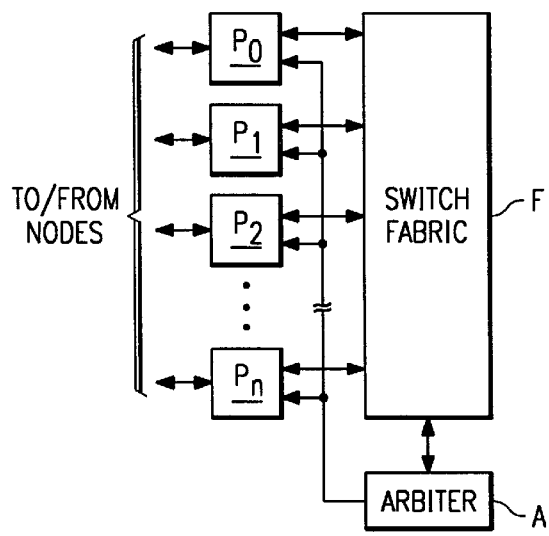
FIG. 1 is an electrical diagram, in block form, of the architecture of a conventional fast packet switch.

As described hereinabove relative to FIG. 1, multiple fabric slices 18 are used to effect routing of packet cells within programmable fast packet switch 10, in order to both meet the high throughput rates required of programmable fast packet switch 10 and also to provide adequate input/output resources for external buffering. The implementation of multiple fabric slices 18 in programmable fast packet switch 10 will now be described in detail, including the selection of the number of slices required.

According to the preferred embodiment of the invention, the switch fabric of programmable fast packet switch 10 has a throughput of up to 622.2 Mbps, so that full speed operation may be evaluated. As noted above, it is desirable that programmable fast packet switch 10 operate according to multiple fast packet switching architectures; an important type of FPS architecture is the Time Division Multiplexing (TDM) bus class. In this example, the four port interfaces 12, realized by TNETA1500 devices as described hereinabove, operate at 155.52 Mbps based upon a supplied 19.44 MHz clock. According to the preferred embodiment of the invention, this same 19.44 MHz clock as used to operate port interfaces 12 may also be used to synchronize transfers over a TDM bus, in which case the TDM bus width provided by the switching fabric of programmable fast packet switch 10 must be at least 32 bits in order to achieve the desired 622.2 Mbps switching rate.

However, the implementation of a full 32-bit switch fabric within a single programmable logic device, such as the Xilinx XC4000 series, is difficult, at best, particularly in implementing TDM bus fast packet switching. As noted above, data is received at 155.52 Mbps by port interfaces 12; as such, in order for switching to occur at 622.2 Mbps, input buffering within the fabric must be used to queue the relatively slow incoming cells, from which a burst read may be used to effect the high speed switching. As conventional FPGAs have limited memory capability, especially if a 32 bit bus width is considered, external queue memories are required for TDM bus fast packet switching. Implementation of such external queuing, considering the 32 bit TDM bus width requirement, exceeds the input/output resources of conventional FPGA devices, however.

According to the preferred embodiment of the invention, therefore, multiple fabric slices 18 are used to effect switching of packet cells. According to multiple-slice switching, the incoming bit streams are converted into a number of parallel streams, each feeding an associated one of several parallel fabric slices. One may readily determine the number of parallel fabric slices by dividing the ideal datapath width by the actual datapath width. In the example of programmable fast packet switch 10 described herein, as noted above the ideal switching datapath width is 32 bits, to achieve a 622.2 Mbps switching rate. In this example, where Xilinx XC4000 series FPGAs are used, an eight-bit internal datapath fits well within the capacity of a single FPGA, particularly when considering the input/output resources necessary for implementing external queue memories; as a result, four fabric slices $18_1$ through $18_4$ are used in this exemplary embodiment of the present invention. It will be understood, however, that other combinations of clock rate and FPGA resources and capacity will result in different numbers of fabric slices 18. It should further be noted that, while the number of fabric slices 18 in this example coincidentally equals the number of port processors 14, the number of fabric slices 18 is not determined from the number of ports, but instead depends upon clock rates and FPGA capacity as described herein.

Figure 4:
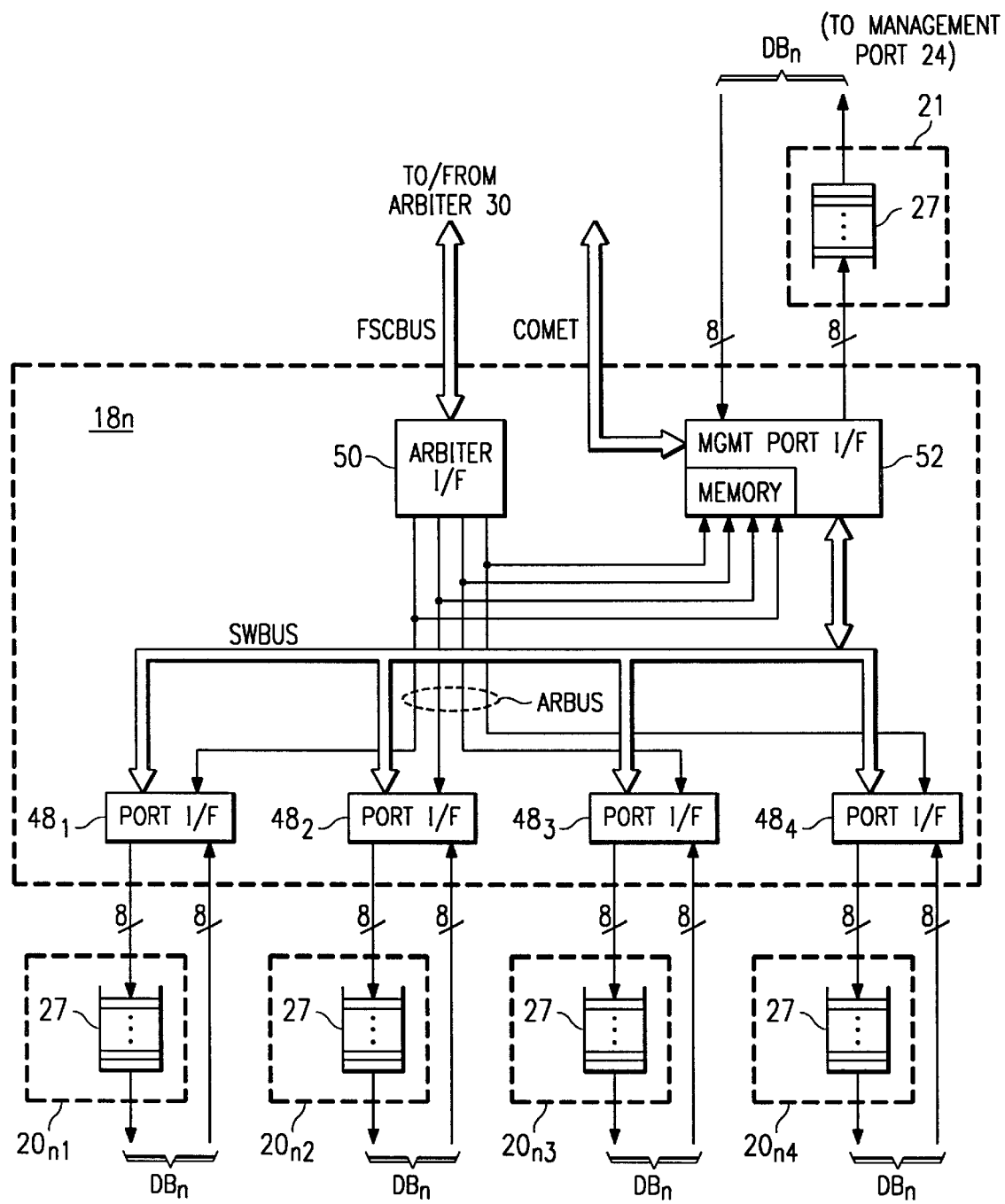
FIG. 4 is an electrical diagram, in block form, of a fabric slice in the programmable fast packet switch of FIG. 2.

According to this preferred embodiment of the invention, each of fabric slices $18_1$ through $18_4$ is preferably realized by way of an SRAM-based FPGA, as described hereinabove, considering that programmable fast packet switch 10 is intended to be capable of operating according to various fast packet switching architectures. As in the case of port processors 14, and as noted above, an example of an SRAM-based FPGA suitable for use as fabric slices 18 is the XC4000 series of FPGAs available from Xilinx, Inc. Referring now to FIG. 4, the functional arrangement of a representative fabric slice $18_n$ will now be described in detail, it being understood that each of fabric slices 18 in programmable fast packet switch 10 will be similarly constructed.

As described earlier relative to FIG. 2, each fabric slice 18 interfaces with its associated data bus $DB_n$, by way of dedicated lines (eight bits wide, in this example) associated with each of port processors 14, and with management port 24. As shown in FIG. 4, fabric slice $18_n$ includes four port interfaces $48_1$ through $48_4$, associated with port processors $14_1$, through $14_4$, respectively. Each of port interfaces $48_1$ through $48_4$ is in bidirectional communication with its group of lines of data bus $DB_n$, in such a manner that incoming cells from port processors 14, or management port 24, are applied directly to port interfaces 48, or management port interface 52, respectively, and such that outgoing cells are applied first to output queue buffers $20_{n1}$ through $20_{n4}$, or 21, depending upon the destination of the cell. Output queue buffers $20_{n1}$ through $20_{n4}$ may be read, over data bus $DB_n$, by associated port processors $14_1$, through $14_4$, respectively; similarly, buffer 21 may be read, over data bus $DB_n$, by management port 24. Each of port interfaces 48 also include temporary input and output buffers for temporarily storing cells received from or to be presented upon data bus $DB_n$.

As illustrated in FIG. 4, each of output queue buffers $20_{n1}$ through $20_{n4}$ and 25 buffer 21 are similarly constructed, in this embodiment of the invention, to include queue 27. Queue 27 is preferably a FIFO, or alternatively a randomly accessible register file, in which multiple cells may be stored in a queued fashion, and retrieved under the control of a signal from arbiter 30. According to this embodiment of the invention, queue 27 may be programmed as a temporary store or buffer, for example simply to synchronize the presentation of a cell onto data bus $DB_n$, when output queuing is not programmed, in which case queue 27 will have a capacity of a single entry. Queue 27 may alternatively be programmed to have a multiple entry capacity to perform output queuing in a particular fast packet switching architecture.

In fabric slice $18_n$ when programmed into a TDM bus architecture, port interfaces 48 are bidirectionally connected to switching bus SWBUS, as shown in the example of FIG. 4, by way of which cells are communicated among port interfaces $48_1$ through $48_4$ to effect routing of the cell from its input port to its output port. In other architectures, a crossbar or a multi-stage interconnection network will be used for the routing, as programmed into fabric slice $18_n$, in which case the actual routing will not correspond to the example of FIG. 4. Control of communication of data over the routing fabric is maintained by arbiter 30 over switch fabric control bus FSBUS; within fabric slice $18_n$, arbiter interface 50 receives arbitration signals from arbiter 30, and controls port interfaces $48_1$ through $48_4$, by way of control signals on bus ARBUS, to communicate cells over the routing fabric (e.g., over switching bus SWBUS in the TDM bus architecture shown in FIG. 4). In operation, arbiter interface 50 receives arbitration signals from arbiter 30 for each cell routing event. In turn, during an internal cell switching time, arbiter interface 50 controls a selected one of port interfaces $48_1$ through $48_4$ to drive data into the routing fabric (e.g., switching bus SWBUS in the example of FIG. 4) and a selected other one of port interfaces $48_1$ through $48_4$ to receive the data from the routing fabric, thus effecting routing of a cell through fabric slice $18_n$. As will be described in further detail hereinbelow, arbiter 30 will generally be controlling each of fabric slices $18_1$ through $18_4$ to similarly route a cell, thus effecting, in this example, a thirty-two bit cell routing by way of four parallel eight-bit operations.

Fabric slice $18_n$ also includes management port interface 52, for communicating with management port 24 over bus COMET. In this example, management port interface 52 includes SRAM cells that may be written with configuration information from management port 24 over bus COMET, and by way of which fabric slice $18_n$ may be programmed according to the desired architecture, for example by defining the routing fabric (e.g., switching bus SWBUS in the TDM architecture of the example of FIG. 4), enabling or disabling queues 27 in output queues 20, 21, and the like. In addition, the results of the operation of fabric slice $18_n$ are stored by management port interface 52 in its memory portion 53, from which information may be retrieved by management port 24 over bus COMET during evaluation. These statistics can include such data as counts of the arbiter signals on bus ARBUS, the frequency of switching operations over switching bus SWBUS, and the like. Additionally, as illustrated in FIG. 2, a normal cell forwarding path between management port 24 and fabric slices 18 may also be implemented, in connection with buffers 21 that are used to forward signaling, and operations and maintenance (OAM), cells to host CPU 2 via the host peripheral bus (e.g., PCI bus BUS).

Referring back to FIG. 2, attention is directed to arbiter 30. Arbiter 30, according to this preferred embodiment of the invention, is also preferably realized by an SRAM-based FPGA, so as to perform the logical operations appropriate for the particular architecture and traffic management algorithms to be used. In this regard, as shown in FIG. 2 and as discussed above, arbiter 30 is connected to bus COMET to receive a programming bit-stream from host CPU 2 via PCI controller 26 and management port 24. In addition, the particular arbitration schemes to be utilized by arbiter 30, such arbitration schemes stemming directly from the traffic management algorithms to be evaluated by operating programmable fast packet switch 10, are programmed into arbiter 30 over bus COMET. Operational results may also be stored in a memory portion of arbiter 30, for communication to management port over bus COMET during evaluation of the operation of programmable fast packet switch 10.

In operation, arbiter 30 operates as a central controller for programmable fast packet switch 10 in effecting the routing of packet cells. In each cell time, arbiter 30 receives the routing label of recently-received cells from port processors 14 over bus PPCBUS; in addition, arbiter 30 may also receive output port requests from input queues 16 (if enabled), indicating cells that are awaiting switching. If appropriate, arbiter 30 may also, during this cell time, instruct one of port processors 14 (or input queues 16) to forward a cell to fabric slices 18 over the appropriate data bus DB. In response, arbiter 30 processes the routing label information and instructs the appropriate fabric slices 18, over bus FSBUS, to carry out the appropriate routing for that cell time. Over time, statistics regarding the operation of arbiter 30 are stored in a memory portion thereof, and forwarded on request to management port 24 over bus COMET.

Figure 5:
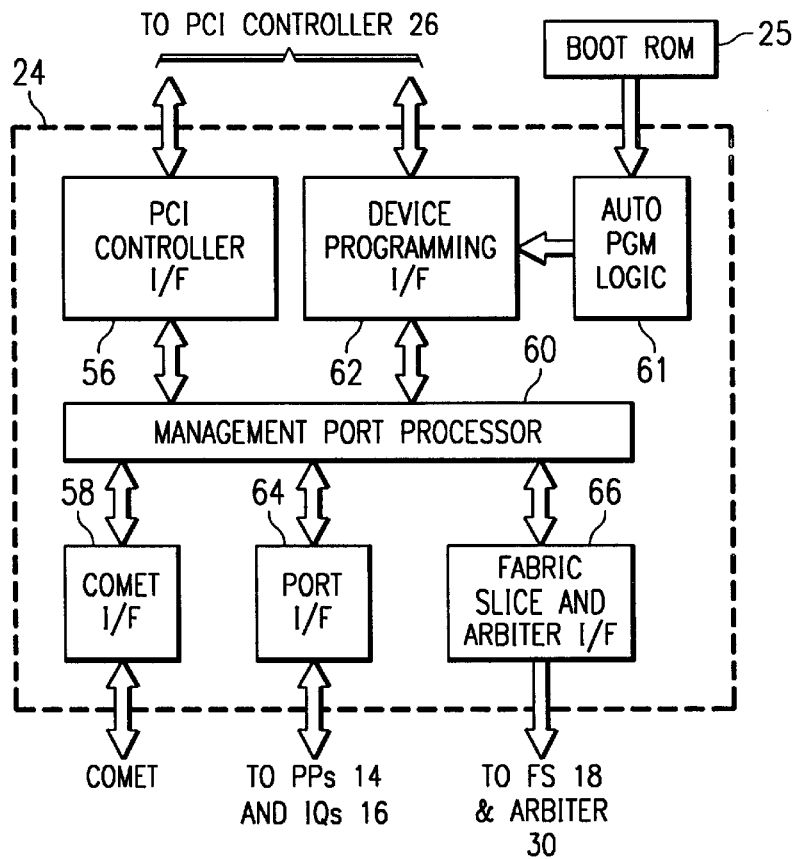
FIG. 5 is an electrical diagram, in block form, of a management port processor in the programmable fast packet switch of FIG. 2.

Management port 24, as noted hereinabove, controls both the programming and configuration of programmable fast packet switch 10 and also the monitoring and measurement of its operation, using bus COMET. Referring now to FIG. 5, the construction of management port 24 according to the preferred embodiment of the invention will now be described in detail.

As illustrated in FIG. 5, management port 24 includes management port processor 60, which is preferably a field programmable logic device, such as an SRAM-based FPGA, that is capable of executing instructions received from host CPU 2 and for effecting the appropriate control and data gathering operations described herein. Management port processor 60 receives host instructions from PCI controller 26 (FIG. 2), via PCI controller interface logic 56 in management port 24, as shown in FIG. 5. Management port processor 60 programs, issues configuration instructions to, and requests and receives operational statistics from, port processors 14, fabric slices 18, and arbiter 30 by way of COMET interface logic 58, which communicates with management port processor 60 to issue and receive commands and data over bus COMET. As described hereinabove relative to FIG. 2, bus COMET is orthogonal to the datapaths in programmable fast packet switch 10, so that the configuration of the particular fast packet switching architecture, and the receipt of operating results and statistics, may be effected in a transparent manner relative to the data communication within programmable fast packet switch 10.

As described hereinabove, port processors 14, fabric slices 18, and arbiter 30 (as well as management port 60 itself) are all preferably realized as SRAM-based FPGA devices. Upon power-up of such devices, the states of the SRAM memory in these devices is indeterminate, as is well-known in the art. According to the preferred embodiment of the invention, a certain amount of programming of these devices is preferably performed automatically upon power-up, so that port processors 14, fabric slices 18, and arbiter 30 are all able to receive configuration commands and information over bus COMET to establish the architecture of programmable fast packet switch 10 and any traffic management algorithms. In addition, management port processor 60 must also be configured and initialized upon power-up, as it is also preferably implemented as an SRAM-based FPGA. According to the preferred embodiment of the invention, therefore, boot read-only-memory 25, which is preferably realized by way of an electrically programmable read-only memory (EPROM), is in communication with auto-programming logic 61 within device programming interface 62 of management port 24. Programming data that are stored in boot ROM 25 are read by auto-programming logic 61 upon power-up, which in turn effects programming of management port processor 60. Device programming interface 62 also effects the communication of initial programming information, as bit streams, to port processors 14 and input queues 16 via port interface 64 of management port 24, and to fabric slices 18 and arbiter 30 via fabric slice and arbiter interface 66 of management port 24. Once the initializing bitstreams are communicated to port processors 14, fabric slices 18, and arbiter 30, these components of programmable fast packet switch 10 are then ready to accept final configuration information from management port processor 60 over bus COMET.

Once management port processor 60 is initialized, management port 24 establishes communication with host CPU 2 via PCI controller 26 (FIG. 2), and thereafter acts as a hardware agent of host CPU 2. Host CPU 2 now forwards programming commands, in the form of a downloaded bit-stream, to management port 24 in programmable fast packet switch 10; these commands are executed by management port processor 60 to program port processors 14, fabric slices 18, and arbiter 30. This programming, which may be performed simply by downloading the bit-streams into port processors 14, fabric slices 18, and arbiter 30, establishes the definition of the fast packet switch architecture of programmable fast packet switch 10. After programming is complete, host CPU 2 may now configure programmable fast packet switch 10 so as to implement traffic management algorithms in the programmable fast packet switch 10, and to set operational parameters. Host CPU 2 may thereafter also issue instructions to management port processor 60 via PCI controller 26, particularly to request operational statistics of programmable fast packet switch 10. Management port processor 60 executes such instructions by issuing read and write requests over bus COMET to port processors 14, fabric slices 18, and arbiter 30, as desired by the particular instruction.

Figure 6:
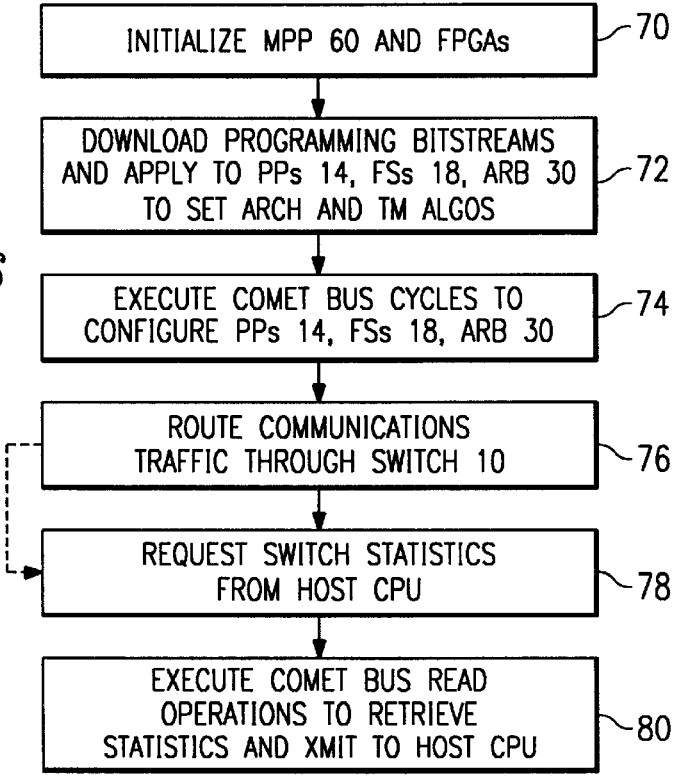
FIG. 6 is a flow chart illustrating the operation of a prototype programming and operation of the programmable fast packet switch of FIG. 2, according to the preferred embodiment of the invention.

Referring now to FIG. 6, the operation of programmable fast packet switch 10 in performing a prototype evaluation of a fast packet switch architecture in combination with a traffic management algorithm will now be described. The sequence of operations described relative to FIG. 6 is presented by way of example only, it being understood that programmable fast packet switch 10 according to the preferred embodiment of the invention is beneficial not only in this and other evaluation exercises, but also functions as an actual fast packet switch and as such may simply be used in telecommunications. Of course, the programmability of the port processors 14, fabric slices 18, and arbiter 30 in programmable fast packet switch 10 according to the preferred embodiment of the invention is especially beneficial in the prototype evaluation process.

The operation of a prototype evaluation sequence, according to the exemplary embodiment of FIG. 6, begins with power up of the host computer, including programmable fast packet switch 10, in process 70. As described hereinabove relative to FIG. 5, power-up and initialization process 70 is performed by auto-programming logic 61, in device programming interface 62 of management port 24, reading a programming bit-stream from boot ROM 25, responsive to which the structure of management port processor 60 is defined and realized. In addition, management port processor 60 also executes instructions received over the PCI bus to program the other FPGA components of programmable fast packet switch 10; according to the preferred embodiment of the invention, therefore, port processors 14, fabric slices 18, and arbiter 30, and also possibly input queues 16, are initialized in process 70 so as to be programmable in response to instructions forwarded on bus COMET.

In process 72, host CPU 2 issues commands, over PCI bus BUS to PCI controller 26 of programmable fast packet switch 10, that specify particulars of the fast packet switching architecture into which programmable fast packet switch 10 is to be programmed for purposes of evaluation. In process 72, programming bit-streams are downloaded by host CPU 2 via the management port processor 60 to establish the switch architecture to be effected by fabric slices 18, examples of which include time-division multiplexing (TDM) bus, crossbar, and the like. Process 72 also programs the traffic management algorithms into port processors 14, fabric slices 18, and arbiter 30 for controlling the actual routing of packet cells. Examples of traffic management algorithms include selective packet discard routines, scheduling routines, and the like.

In response to the commands issued by host CPU 2 in process 72, management port processor 60 performs process 74, in which management port processor 60 issues write commands over bus COMET (via COMET interface 58) to set the state of specific SRAM locations in the SRAM-based FPGA devices in programmable fast packet switch 10, such FPGAs including port processors 14, fabric slices 18, and arbiter 30. For example, process 74 writes data to SRAM locations in each of port processors 14 to set the VPI/VCI tables in VPCI translator/arbiter 38 and VPCI translator 40 of each of port processors 40. These commands include the setting of the VPI/VCI tables to map the destinations of packets, and the selection of the priority of queuing to be effected (up to two priorities being supported in this example). In addition, host CPU 2 may also issue commands corresponding to traffic management algorithms to be used by programmable fast packet switch 10 in performing its packet switching and routing functions for purposes of the present evaluation.

Following configuration process 74, programmable fast packet switch 10 is ready for operation, which occurs in process 76 by the routing and packet switching of actual data in a network. The operation of process 76 is not a simulation, but instead is the actual operating of a switch to route real traffic at full speed, thus providing the most accurate evaluation conditions for the prototype architecture and traffic management algorithm combination.

A selected subset of examples of the configuration and architecture of programmable fast packet switch 10 according to the preferred embodiment of the invention will now be described, by way of example. These exemplary architectures may be programmed into the SRAM-based FPGA devices used for port processors 14, fabric slices 18, and arbiter 30 in process 74; the operation of these examples in process 76 will also be briefly described.

Figure 7A:
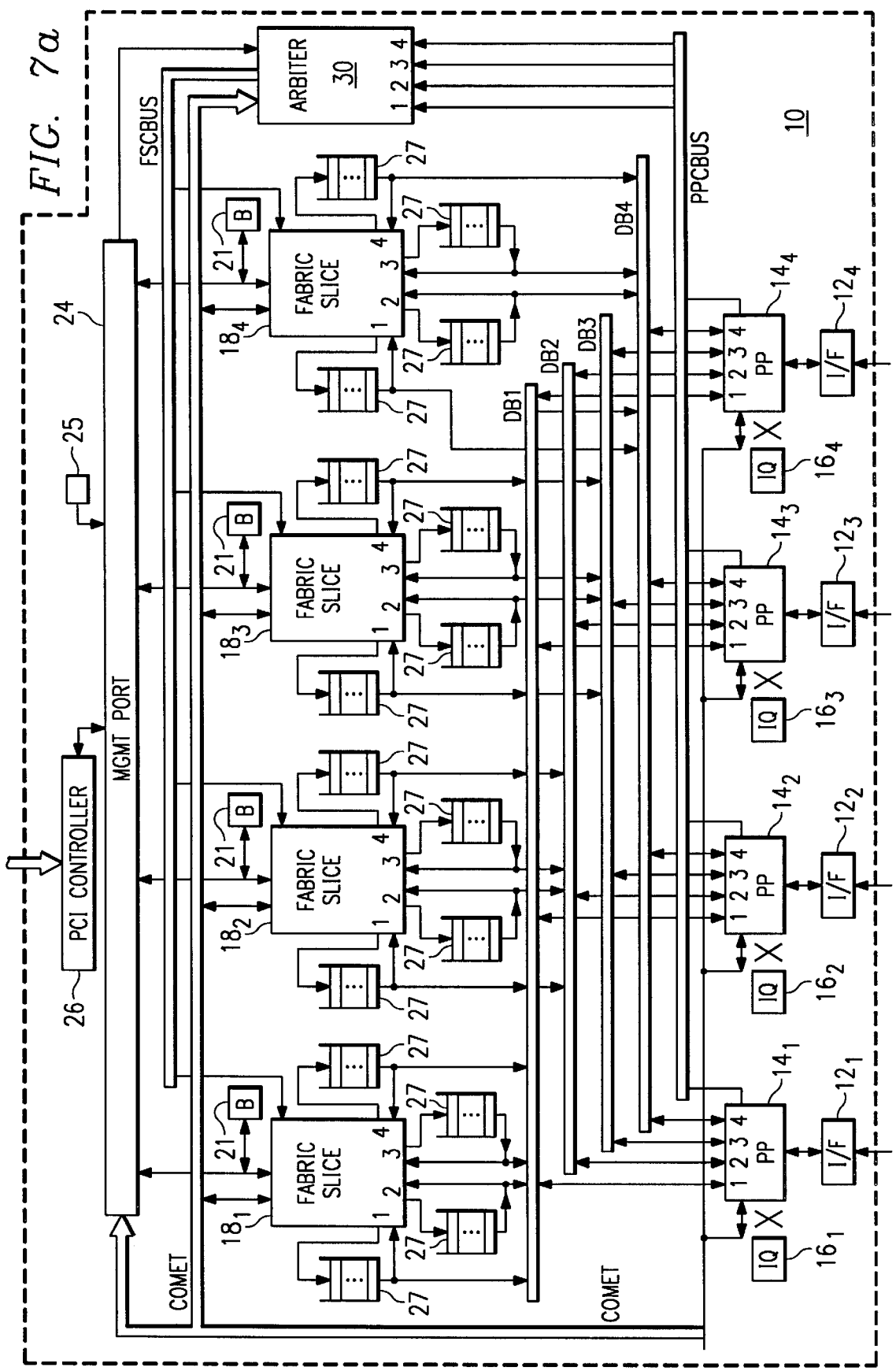

FIG. 7a illustrates an exemplary architecture of programmable fast packet switch 10 in which fabric slices 18 are programmed in process 72, configured in process 74, and operated in process 76, according to a time-division multiplex (TDM) bus architecture, using output queues and no input queues. Fabric slices 18 are each programmed by the downloading of an appropriate bit-stream via management port processor 60 and over bus COMET, so that fabric slices 18 each forward all outgoing cells, after routing, to queue 27 within the appropriate one of output queues 20 for temporary storage until the output side of the associated one of port processors 14 issues a read request. According to this architecture, each queue 27 is programmed to operate as a multiple-entry FIFO.

While not visible in FIG. 7a, fabric slices 18 and arbiter 30 are also programmed by downloading into them, over bus COMET, to operate in a TDM bus manner. In operation in this mode, each incoming cell will be immediately forwarded by its port processor 14 to one of the fabric slices 18 as indicated by the translators 38, 40 therein, with no queuing at port processors 14. In combination with this forwarding, port processors 14 forward routing labels with the received cells to arbiter 30, which uses these routing labels in queuing and releasing the cells after routing by fabric slices 18. In this example, where four fabric slices 18 are utilized, four eight-bit cell slices are forwarded by one of port processors 14 in each cell cycle, one to each of fabric slices $18_1$ through $18_4$. Arbiter 30 controls the operation of fabric slices $18_1$ through $18_4$ to route the incoming cell to the appropriate output queue 20 for that cell, according to a TDM bus scheme, and appends the routed cells to the output queues 20.

During each cell time in this example, one of port processors 14 will be allowed to read exactly one cell from the highest priority non-empty queue 20, under the control of arbiter 30 via PPCBUS; in this example, the output port processor 14 will receive a slice of the cell from each of four queues 20 associated with that port processor 14. For example, if port processor $14_2$ is to output a cell during a cell time, port processor 14 will request and receive cell slices, eight-bits at a time, from queue 27 in output queue $20_{12}$ via data bus DB1, from queue 27 in output queue $20_{22}$ via data bus DB2, from queue 27 in output queue $20_{32}$ via data bus DB3, and from queue 27 in output queue $20_{14}$ via data bus DB4. The output port processor 14 will then forward the received routed cell to its port interface 12, for output to the appropriate device.

By way of further description, an example of a traffic management algorithm useful in the architecture of FIG. 7a, namely selective packet discard, will now also be described. As noted above, traffic management algorithms are programmed into port processors 14, fabric slices 18, and arbiter 30, in process 72. The selective packet discard algorithm is intended to handle the case where queues 27 in output queues 20 are filled but where additional cells are being routed by fabric slices 18; according to this algorithm, the later-arriving cells are discarded, and the packet with which the discarded cell or cells is associated is not sent out to the network (as it is corrupt due to the discarded cells).

This algorithm operates upon one or more of fabric slices 18 detecting that its queue 27 is full and that an additional cell has been routed and must be discarded, in which case fabric slice 18 indicates to port processors 14 an identifier of the packet with which the discarded cell is associated. Port processors 14 then mark the virtual channel (VC) with which the identified packet is associated, and discard all additional cells for that virtual channel, until the last cell of the packet is received, following which the packet is reset. As apparent from the foregoing description, this traffic management algorithm is programmed into port processors 14 and fabric slices 18, transparently relative to arbiter 30.

Referring now to FIG. 7b, an exemplary architecture of programmable fast packet switch 10 is illustrated, in which fabric slices 18 are programmed in process 72, configured in process 74, and operated in process 76, according to a crossbar architecture using input queues at the ports. In this example, as illustrated in FIG. 7b, input queues 16 are used by their associated port processors 14 to store incoming cells, and queues 27 in output queues 20 are programmed to have a capacity of only a single entry, to simply buffer routed cell slices as forwarded to data buses DB. This programming is effected by downloading, via management port processor 60 and over bus COMET, an appropriate bit-stream into port processors 14, fabric slices 18, and arbiter 30. While not visible in FIG. 7b, fabric slices 18 and arbiter 30 are configured to operate cell routing in a crossbar fashion.

The operation of programmable fast packet switch 10 during process 76, according to the crossbar architecture as illustrated in FIG. 7b and in connection with another example of a traffic management algorithm, namely scheduling, will now be described. The scheduling algorithm is also programmed into programmable fast packet switch 10 for use in connection with this crossbar architecture in which input queues 16 are enabled. In operation, received cells are placed by each of port processors 14 into their associated input queues 16; each of port processors 14 also forwards the routing labels and priority information of the oldest M (M being a configuration parameter set in process 74) of cells in its queue 16, over bus PPCBUS. Arbiter 30 then controls the order in which cells are communicated from port processors 14 to fabric slices 18 during each cell time; not every port processor 14 may forward a cell to fabric slices 18 in each cell time, as the cell may be contending for the same output as a cell at another input. Fabric slices 18, according to this implementation, route cells in a crossbar manner. Also during each cell time, one of port processors 14 will read one cell from the port interfaces of fabric slices 18 via the queue 27, programmed as a buffer.

According to a third example, which may be viewed with reference to FIG. 2, fabric slices 18 are programmed, in process 74, and operated, in process 76, according to a multistage interconnection network architecture using both input queues at the ports and output queues at the switch fabric. In this example, input queues 16 are all enabled for use by their associated port processors 14, and queues 27 in each of output queues 20 are programmed as FIFOs, storing multiple output cells as received from their associated fabric slices 18. Each of these configurations is effected by downloading, via management port processor 60 and over bus COMET, an appropriate bit-stream into port processors 14, fabric slices 18, and arbiter 30. While not visible in FIG. 7b, fabric slices 18 and arbiter 30 are configured to operate cell routing in a multistage interconnection network fashion, as will now be described.

In the operation of this example in process 76, each port processor 14 places its received cells into its associated input queue 16, while ensuring that a cell is always ready for forwarding to fabric slices 18 in each cell time. Upon being enabled by arbiter 30 to forward a received cell, port processor 14 places its cells on data buses DB and forwards routing label information to arbiter 30 on bus PPCBUS. After routing of the cells by fabric slices 18, and during each cell time, one of port processors 14 reads a cell from the highest priority non-empty one of output queues 20 for fabric slices 18, for output to its port interface 12.

In any event, operation of programmable fast packet switch 10 according to the configured architecture and traffic management algorithm continues in process 76, for so long as desired by host CPU 2.

Either after completion of the operation of process 76, or during process 76, host CPU 2 may request certain operational information from programmable fast packet switch 10, in process 78. This information includes information based upon which the host computer may evaluate the quality-of-service of the prototype switch and traffic management algorithm in a telecommunications switching environment, such as data throughput, identification of congested packets, bandwidth, delay, jitter, and cell loss rate. In process 78 according to the preferred embodiment of the invention, host CPU 2 requests certain raw data, such as counts of received, discarded, and transmitted cells, from programmable fast packet switch 10 from which these statistics may be obtained, by forwarding instructions in this regard to management port processor 60 via PCI controller 26.

In execution of the instructions from host CPU 2, management port processor 60 executes read operations over bus COMET, by way of which selected SRAM locations within each of the FPGA-implemented components, namely port processors 14, fabric slices 18, and arbiter 30, may be read by management port processor 60. This information, by being communicated over bus COMET which is orthogonal to the datapaths in programmable fast packet switch 10, ensures that the evaluation process does not interfere with or slow down the switching of actual data, in the event that such reporting is requested during operation; in addition, circuit complexity is reduced by eliminating the need for multiplexing circuitry that would otherwise be necessary to multiplex reporting information and packet data over the same lines.

According to the preferred embodiment of the invention, therefore, important benefits are provided by programmable fast packet switch, particularly in the evaluation of prototype architectures, traffic management algorithms, and combinations thereof. The present invention provides the capability of programmably defining a fast packet switching architecture that can operate according to a selected one of several switch fabric types, and using input queuing, output queuing, or both. According to any of the configurations, the present invention provides a testbed in which ports operate at full speed, thus providing the capability of evaluating the prototype switch architecture and operation relative to actual network traffic, communicated at full speed.

This programmability of the switch is implemented, according to the preferred embodiment of the invention, through the use of field-programmable devices for certain components of the switch. In the preferred embodiment of the invention, port processors, the switch fabric, a central arbiter, and a management port processor are all realized in field programmable logic, preferably as SRAM-based FPGAs; the programmability of these particular components permit a wide range of architectures and traffic management schemes to be evaluated according to the present invention. Conversely, those components that require full performance, such as interface circuitry, is implemented using industry standard high-performance components, thus enabling full speed operation. Use of conventional host interface circuitry, such as by way of the well-known PCI bus standard, facilitates management and use of the prototyped switch in a wide range of equipment, at relatively low cost.

The arrangement of the programmable fast packet switch according to the preferred embodiment of the invention also is implemented in such a manner that the highest speed datapath, namely the switch fabric, is maintained within integrated circuits, and does not rely upon communication between integrated circuits. In addition, the preferred embodiment of the invention is implemented according to a multiple fabric slice arrangement, which permits relatively slow FPGAs to effect high data rate switching operations, and also to utilize external queue memories.

In addition, according to the preferred embodiment of the invention, management of the prototyped fast packet switch is effected by way of a dedicated bus that is orthogonal to the datapaths in the switch. This dedicated bus may be used to configure the architecture and traffic management of the switch, and also to communicate the results of switch operation to the host computer. Other connections within the switch remain general-purpose, permitting a wide range of data types to be switched thereby.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A programmable fast packet switch, comprising:
    a plurality of port interfaces, for receiving message cells from and transmitting message cells to external network nodes;
    a plurality of port processors, each coupled to one of the plurality of port interfaces and comprised of programmable logic, for generating routing labels for message cells received at its associated port interface, and for applying outgoing message cells to its associated port interface;
    a switch fabric, coupled to each of the plurality of port processors, and comprised of programmable logic, for receiving message cells from the plurality of port processors and for routing the message cells to the plurality of port processors;
    an arbiter, comprised of programmable logic, for controlling the communication of message cells among the plurality of port processors and the switch fabric responsive to the routing labels generated by the plurality of port processors; and
    a management port, for receiving programming data from a host computer and for programming the plurality of port processors, the switch fabric, and the arbiter responsive to the received programming data.

2. The programmable switch of claim 1, further comprising:
    a plurality of input queues, each coupled to one of the plurality of port processors, for temporarily storing message cells received by its associated port processor;
    wherein the port processors are programmed by the management port to selectively forward received message cells directly to the switch fabric or to the input queues, responsive to the received programming data.

3. The programmable switch of claim 2, further comprising:
    a plurality of output queues coupled to the switch fabric, each associated with one of the plurality of port processors, and each for queuing a plurality of message cells;
    wherein the switch fabric is programmed by the management port to selectively forward message cells to the output queues responsive to the received programming data.

4. The programmable switch of claim 1, further comprising:
    at least one data bus coupled to the plurality of port interfaces and to the switch fabric, for communicating message cells therebetween; and
    a management bus, coupled to the management port, to the plurality of port processors, to the switch fabric, and to the arbiter, for communicating programming information from the management port to the plurality of port processors, to the switch fabric, and to the arbiter.

5. The programmable switch of claim 4, wherein each of the plurality of port processors, the switch fabric, and the arbiter, comprise static random access memory based field programmable logic;
    and wherein the management port programs the plurality of port processors, the switch fabric, and the arbiter by communicating signals corresponding to the received programming data over the management bus.

6. The programmable switch of claim 4, wherein each of the plurality of port processors, the switch fabric, and the arbiter comprise memory for storing result information regarding the operation of the programmable switch;
    and wherein the management port is also for reading result information from memory in the plurality of port processors, the switch fabric, and the arbiter over the management bus.

7. The programmable switch of claim 6, further comprising:
    a control bus coupled to the arbiter, to each of the plurality of port processors, and to the switch fabric, for communication of control signals from the arbiter to the plurality of port processors and to the switch fabric.

8. The programmable switch of claim 1, wherein the switch fabric comprises:
    a plurality of fabric slices, each comprised of programmable logic, each of the plurality of fabric slices coupled to each of the plurality of port processors, and to the arbiter, and each for receiving message cells from one of the plurality of port processors and for routing the message cells to another one of the plurality of port processors under the control of the arbiter.

9. The programmable switch of claim 8, further comprising:
    a plurality of output queues coupled to each of the plurality of fabric slices, each output queue associated with one of the plurality of port processors, and each for queuing a plurality of message cells;
    wherein each of the fabric slices is programmed by the management port to selectively forward routed message cells to the output queues responsive to the received programming data.

10. The programmable switch of claim 1, further comprising:
a bus interface, coupled to the management port, for communicating programming data from the host computer to the management port.

11. A method of evaluating the operation of a programmable fast packet switch according to a selected architecture, wherein the programmable fast packet switch is comprised of a plurality of port interfaces for receiving and transmitting message cells, a plurality of port processors associated with the port interfaces and coupled to a switch fabric, and an arbiter coupled to the port processors and to the switch fabric for controlling the routing of message cells therethrough, the method comprising the steps of:
programming logic in the switch fabric, in the arbiter, and in the plurality of port processors, to operate according to the selected architecture;
applying message traffic to at least one of the plurality of port interfaces, the message traffic including message packets addressed to others of the plurality of port interfaces;
operating the programmable fast packet switch to route the applied message traffic among the plurality of port interfaces;
during the operating step, storing result information in each of the switch fabric, arbiter, and plurality of port processors; and
retrieving the stored result information from the switch fabric, arbiter, and plurality of port processors.

12. The method of claim 11, wherein the programmable fast packet switch includes at least one data bus coupled between each of the plurality of port processors and the switch fabric, and further comprises a management port for receiving programming data from a host computer and for forwarding result information to the host computer, the management port coupled to each of the plurality of port processors, the arbiter, and the switch fabric by way of a management bus;
and wherein the programming step comprises:
receiving programming data from the host computer; and
operating the management port to forward signals corresponding to the received programming data to the plurality of port processors, the arbiter, and the switch fabric over the management bus.

13. The method of claim 12, wherein the received programming data comprise architecture information and traffic management algorithms.

14. The method of claim 12, wherein the plurality of port processors, the arbiter, and the switch fabric comprise static random access memory based field programmable logic;
and further comprising:
operating the management port to execute write operations to the plurality of port processors, the arbiter, and the switch fabric over the management bus, for issuing configuration information to the plurality of port processors, the arbiter, and the switch fabric.

15. The method of claim 14 wherein each of the plurality of port processors, the arbiter, and the switch fabric comprise memory locations for storing the result information;
and wherein the retrieving step comprises executing read operations from memory locations of the plurality of port processors, the arbiter, and the switch fabric over the management bus.

16. The method of claim 12, wherein the switch fabric comprises a plurality of fabric slices, each comprised of programmable logic, and each coupled to each of the plurality of port processors;
and wherein the operating step comprises:
forwarding message cells from one of the plurality of port processors to each of the plurality of fabric slices; and
then operating each of the plurality of fabric slices to route its forwarded message cell to another of the plurality of port processors.

17. A computer system, comprising:
a host central processing unit;
a system bus; and
a programmable fast packet switch, coupled to the system bus, and comprising:
a bus interface, coupled to the system bus;
a plurality of port interfaces, for receiving message cells from and transmitting message cells to external network nodes;
a plurality of port processors, each coupled to one of the plurality of port interfaces and comprised of programmable logic, for generating routing labels for message cells received at its associated port interface, and for applying outgoing message cells to its associated port interface;
a switch fabric, coupled to each of the plurality of port processors, and comprised of programmable logic, for receiving message cells from the plurality of port processors and for routing the message cells to the plurality of port processors;
an arbiter, comprised of programmable logic, for controlling the communication of message cells among the plurality of port processors and the switch fabric responsive to the routing labels generated by the plurality of port processors; and
a management port, for receiving programming data from a host computer and for programming the plurality of port processors, the switch fabric, and the arbiter responsive to the received programming data.

18. The computer system of claim 17, wherein the programmable switch further comprises:
a plurality of input queues, each coupled to one of the plurality of port processors, for temporarily storing message cells received by its associated port processor; and
a plurality of output queues coupled to the switch fabric, each associated with one of the plurality of port processors;
wherein the port processors are programmed by the management port to selectively forward received message cells directly to the switch fabric or to the input queues, responsive to the received programming data;
and wherein the switch fabric is programmed by the management port to selectively forward routed message cells directly to the port processors or to the output queues responsive to the received programming data.

19. The computer system of claim 17, wherein the programmable switch further comprises:
at least one data bus coupled to the plurality of port interfaces and to the switch fabric, for communicating message cells therebetween; and
a management bus, coupled to the management port, to the plurality of port processors, to the switch fabric, and to the arbiter, for communicating programming information from the management port to the plurality of port processors, to the switch fabric, and to the arbiter;

wherein each of the plurality of port processors, the switch fabric, and the arbiter, comprise static random access memory based field programmable logic;

and wherein the management port programs the plurality of port processors, the switch fabric, and the arbiter by communicating signals corresponding to the received programming data over the management bus.

20. The computer system of claim 19, wherein each of the plurality of port processors, the switch fabric, and the arbiter comprise memory for storing result information regarding the operation of the programmable switch;

and wherein the management port is also for reading result information from memory in the plurality of port processors, the switch fabric, and the arbiter over the management bus.

21. The computer system of claim 17, wherein the switch fabric comprises:

a plurality of fabric slices, each comprised of programmable logic, each of the plurality of fabric slices coupled to each of the plurality of port processors, and to the arbiter, and each for receiving message cells from one of the plurality of port processors and for routing the message cells to another one of the plurality of port processors under the control of the arbiter.

* * * * *